United States Patent
O'Loughlin et al.

(10) Patent No.: US 8,548,017 B1
(45) Date of Patent: Oct. 1, 2013

(54) AMPLITUDE COMBINING METHOD FOR PHASE LOCKING FIBER LASERS

(75) Inventors: James P. O'Loughlin, Albuquerque, NM (US); Jeffry P. Heggemeier, Albuquerque, NM (US); Roy A. Hamil, Albuquerque, NM (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 293 days.

(21) Appl. No.: 13/221,450

(22) Filed: Aug. 30, 2011

(51) Int. Cl.
*H01S 3/13* (2006.01)

(52) U.S. Cl.
USPC ..................................... 372/29.016

(58) Field of Classification Search
USPC .................. 372/29.01, 26, 29.015; 342/371, 342/372
See application file for complete search history.

(56) References Cited

U.S. PATENT DOCUMENTS

| 7,058,098 B1 * | 6/2006 | Shay | 372/29.016 |
| 7,187,492 B1 * | 3/2007 | Shay | 359/349 |
| 7,233,433 B1 * | 6/2007 | Shay | 359/349 |

* cited by examiner

*Primary Examiner* — Jessica Stultz
*Assistant Examiner* — Tuan Nguyen
(74) *Attorney, Agent, or Firm* — James M. Skorich; Kenneth E. Callahan

(57) ABSTRACT

A method for implementing a coherent laser beam combining system in which a master laser oscillator output is split into N signals, fed through N phase adjusters and N amplifiers and combined in a coherent power combiner. The output of the combiner is sampled and sent to a processor. The processor selects one of the N phase adjusters, sweeps the phase in small steps over a $2\pi$ range, and locks the phase of that adjuster to the phase that corresponds to the maximum value of the combiner sample for that sweep cycle. The process is repeated for all the remaining phase adjusters resulting in maximizing the combiner output. The sweep cycles are repeated continuously to correct any phase errors that may occur over time. A similar method can be used in which both the polarizations and the phases of the N signals are maximized to thereby maximize the output of the coherent power combiner.

5 Claims, 4 Drawing Sheets

M arrays of N amplifiers per array combined

US 8,548,017 B1

AMPLITUDE COMBINING METHOD FOR PHASE LOCKING FIBER LASERS

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

The invention relates generally to a method for phase locking and coherently combining multiple laser amplifiers, and in particular to sweeping amplifier phase modulators in small steps over a $2\pi$ range sequentially and selecting the phase of each that maximizes the combined output.

The intensity and, hence, the power available from a single-mode optical fiber is limited by either optical surface damage or nonlinear optical effects. These limitations can be overcome by coherent beam-combining of the output power from multiple optical fibers. Fine control of the optical phase is required for any multi-fiber approach.

The most relevant prior art is embodied in the three patents of Thomas M. Shay, 7,058,098 B1, 7,187,492 B1, and 7,233,433 B1. These three patents have similar titles: "Self-referenced (or Self-synchronous) Locking of Optical Coherence by Single-Detector Electronic-Frequency Tagging". They employ the same basic principle of frequency tagging, and phase detection and processing. A simplified block diagram typical of this method is shown in FIG. 1. A master oscillator 1 is power divided 2 and provides the inputs to the N amplifiers 5 after first passing through modulators 3 and adjustable phase shifters 4. The method is based on tagging the N amplifiers 5 with a unique frequency. The modulation process produces unique side-band frequencies on the signal related to the tag frequency. The tag frequency sideband provides the means for identifying the signal of each specific amplifier output and in addition carries the phase information of the amplifier, which is necessary during the processing function of the method. This modulation is accomplished by the Tag Oscillator 12 modulating the amplifier input via the modulator 3. The type of modulation may be phase modulation, frequency modulation or amplitude modulation, anyone of which can serve the purpose of the method.

These three patents relate to the different types or combinations of types of modulation; however, the basic overall method is the same. The outputs of the amplifiers 5 are combined into a single output beam 10 by the coherent power combiner 6. A small sample of the output beam 10 is sampled by the coupler 7 which is input to the photodetector 8. The photodetector 8 output contains all of the individual amplifier outputs including the tagging sidebands. This complex output is mixed individually 11 with each tag oscillator 12. The mixer 11 output is processed 13 to extract the phase of the corresponding amplifier 5. The processor 13 then generates an error signal that produces the drive signal for the phase shifter 4 based on a negative feedback process. The negative feedback process is so configured as to correct the phase of each amplifier 5 output to match the phase of the other amplifiers and thereby provide the necessary condition to combine the power from each amplifier into a single coherent beam 10.

SUMMARY

In applications requiring a higher laser power than that of a single source, it is necessary to coherently combine a plurality of the lower power sources to accomplish the high power requirement. To accomplish this all of the lesser power sources must be at the same frequency and phase so that they will combine to provide a total coherent high power combined output.

One embodiment of the present invention employs an array of N laser amplifiers to achieve this objective. This array of amplifiers is driven from a single master oscillator or source which is power divided to provide the same frequency input to each amplifier in the array. Each such input is passed through a phase adjuster which is driven by a processor. The combined output of the N amplifiers is sampled by a beam splitter and imaged onto a photodetector. The photodetector output is proportional to the total combined power of all of the amplifiers and is the input to the processor.

The processor is designed to select one of the phase adjustors of a single amplifier. The processor then scans the phase adjustor in small steps going from 0 to $2\pi$ and fixes the phase shifter at the value that maximizes the detected total power output. The processor then selects the next phase adjustor and repeats the process of scanning the adjustor in small steps to again maximize the detected total power output for that phase adjuster and so on cycling through all the N phase adjusters. The processor continuously repeats this scanning cycle and optimizing process and eventually reaches a state of phase adjustor settings that results in the maximum possible power output. This state corresponds to all of the amplifiers having the same phase, that is being phase locked, and thus producing the maximum possible combined power output. In addition the processor continuously operates such that any perturbations occurring from whatever source are corrected, thus maintain the optimum power combining performance. The invention provides the simplest known means for obtaining the maximum possible combined total power output from an array of amplifiers to meet the objective of achieving a power level not otherwise possible.

A further embodiment maximizes the polarizations of the N amplifier signals in a similar manner and when combined with the phase adjuster process, maximizes the combined power output.

DESCRIPTION OF THE PREFERRED EMBODIMENT

Figure 2:
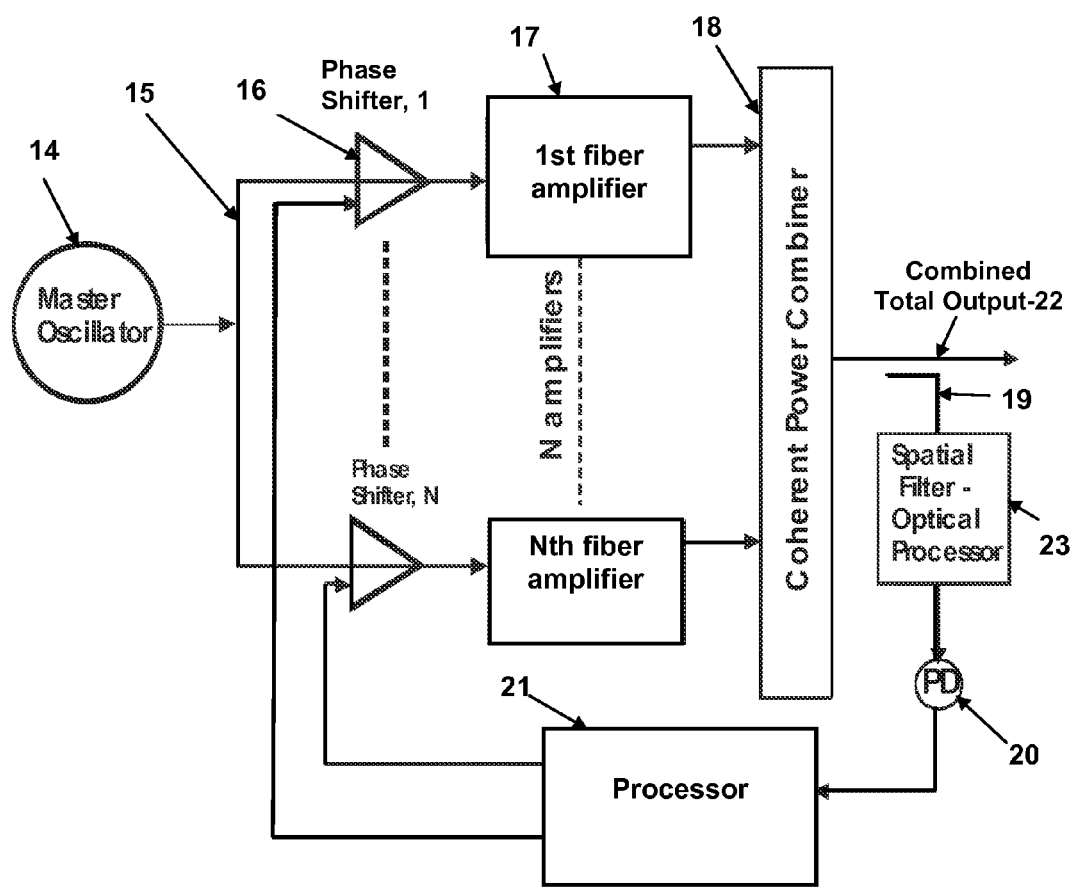
FIG. 2 is a diagram of the random amplitude method for combining laser amplifiers.

Amplitude combining for phase locking fiber lasers is a simple method for coherently combining optical fiber or other types of amplifiers. See FIG. 2 in which an array of N fiber amplifiers 17, are driven by a common stable master oscillator 14. A branch power divider 15 feeds each array amplifier 17 through an adjustable phase shifter 16. The outputs of the array of N amplifiers are optically combined by a coherent power combiner 18 and a sample is split off 19, spatially optically processed 23, and sent to a photodetector 20. The optical processor 23 is a lens arrangement that focuses a far field spot on the photodetector 20, such that the power in the central spot consists of contributions from every fiber amplifier element. The output of the photodetector 20 is a signal proportional to the power in the combined array output 22. This signal is fed to a processor 21 and it is a measure of the level of the combined output power of the N amplifiers. These amplifiers initially have a random phase distribution; thus the power is less than the maximum possible level. The processor functional operation is to select one of the N adjustable phase shifters 16 and sweep it over a $2\pi$ range in small steps, while observing the total output power from the photodetector 20. If a particular phase of the adjustable phase shifter is found that maximizes the total power then that phase shifter is set to that value and remains there unless and until it may undergo a change during a future sweep. The number of steps is based on the power combining error as it relates to phase error. Typically 72 phase steps corresponding to 5 degree steps in 360 degrees would be quite acceptable for most applications. A 5 degree error corresponds to about a 0.08 percent power error (one minus the cosine of 5 degrees squared).

After completing a sweep of a first phase shifter, the processor 21 then selects the next adjustable phase shifter 16 from the array of N phase shifters and repeats the process, cycling through the remaining phase shifters until a cycle of stepping through the N phase shifters is completed. At this point each phase shifter is locked to the phase that maximized the combined output for its sweep. This cycle of stepping through the N phase shifters is then repeated over and over again during the laser operation. If any perturbation occurs for any reason during the laser operation, the continuous processor sweep operations will correct it to maintain the maximum possible power output. The absolute maximum possible power output will be achieved after a few sweep cycles by the processor.

The limitation of the maximum total number, N, of amplifiers that can be included is determined by the time it takes the processor to run through the required number of sequences, the resolution of the sweep step, and the rate and magnitude of the perturbations of the phase that occur.

Figure 1:
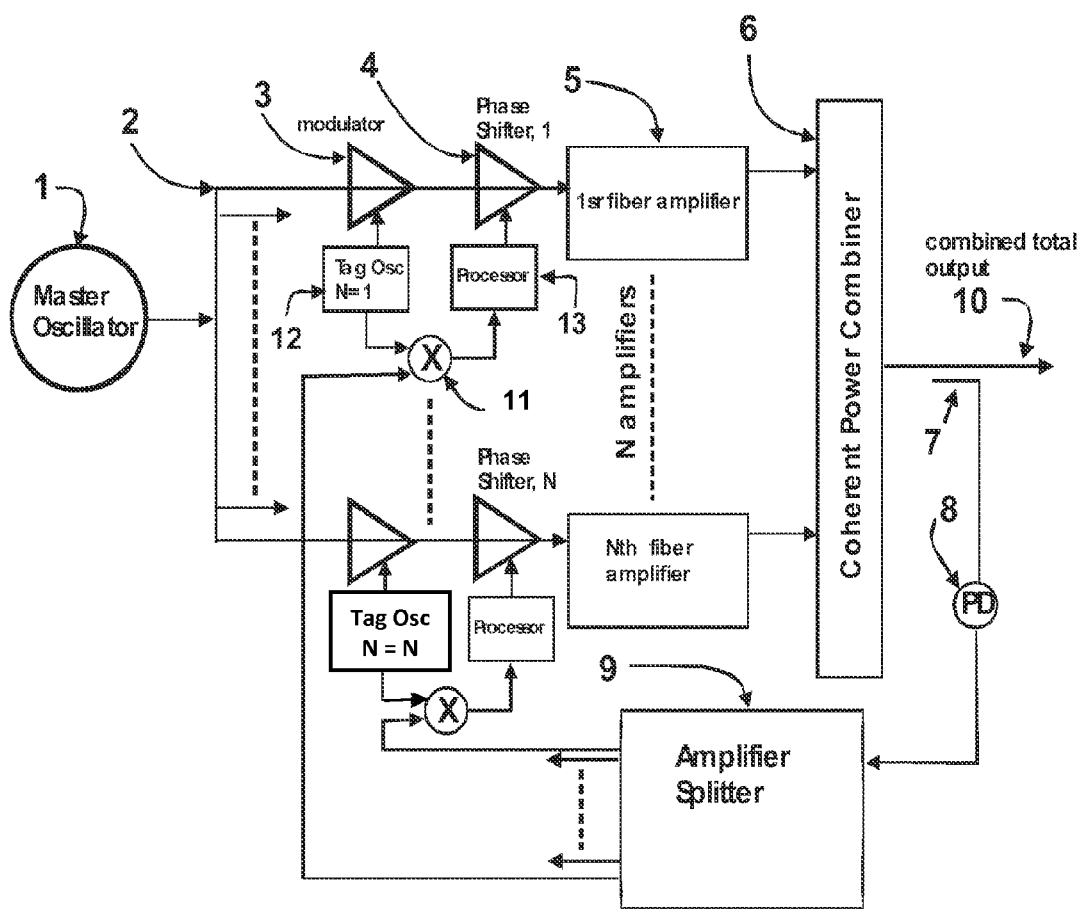
FIG. 1 is a simplified block diagram of a prior art frequency tagging method.

The major advantage of the invention is the simplicity and performance compared to existing methods. The simplicity is quite evident by comparing FIG. 1 to FIG. 2. Instead of identifying and processing a plethora of phases, the invention closes the control loop directly for maximizing the combined total output power. Other methods tend to function on control of the phase matching of the amplifiers by means of laboriously measuring the phase and processing that to maximize the output. These phase measuring approaches are subject to perturbations of phase from thermally induced variations in optical path lengths that require addition methods and hardware to overcome. In addition some phase measuring based methods use tag modulation frequencies for each amplifier to sort out the individual phase of each amplifier for further processing. These tag frequencies remain in the output spectrum after combining. The present invention does not pollute the spectrum with tag frequencies. In addition the invention inherently compensates for perturbations because they are internal to the processor control loop, thus no additional processing and hardware is necessary.

Figure 3:
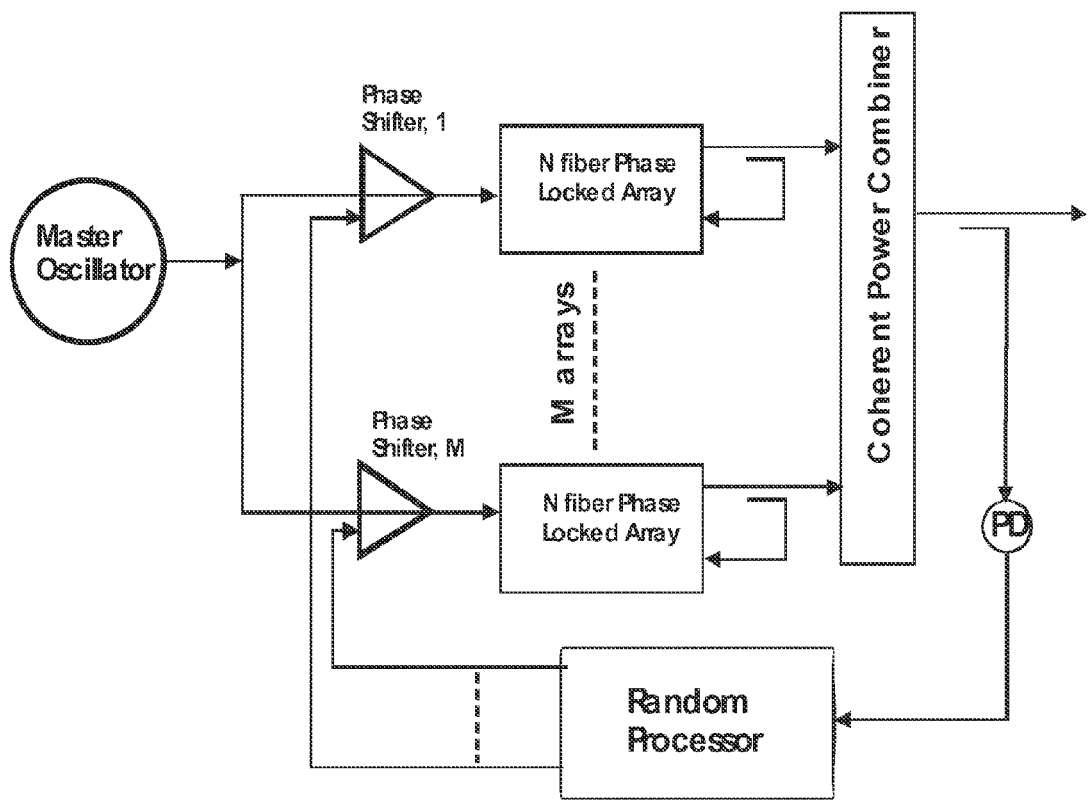
FIG. 3 is a simplified block diagram for combining M arrays of N amplifiers per array into a single array.

Another implementation is to use the invention to combine groups of sub-arrays, wherein each sub-array consists of N amplifiers and there are M groups of sub arrays. Each of the N amplifiers of each sub-array is power combined using the invention and then the group of M sub-arrays is itself power combined in-turn also using the invention; as shown in FIG. 3. The use of the invention to combine arrays of arrays provides for increased system power levels on the order of the number of amplifiers in a sub array, i.e., $N^2$. It also logically follows the invention can be further extended to combine arrays of arrays of arrays, etc; thus in principle to power levels limited by other factors such as air breakdown, optics damage, etc.

Figure 4:
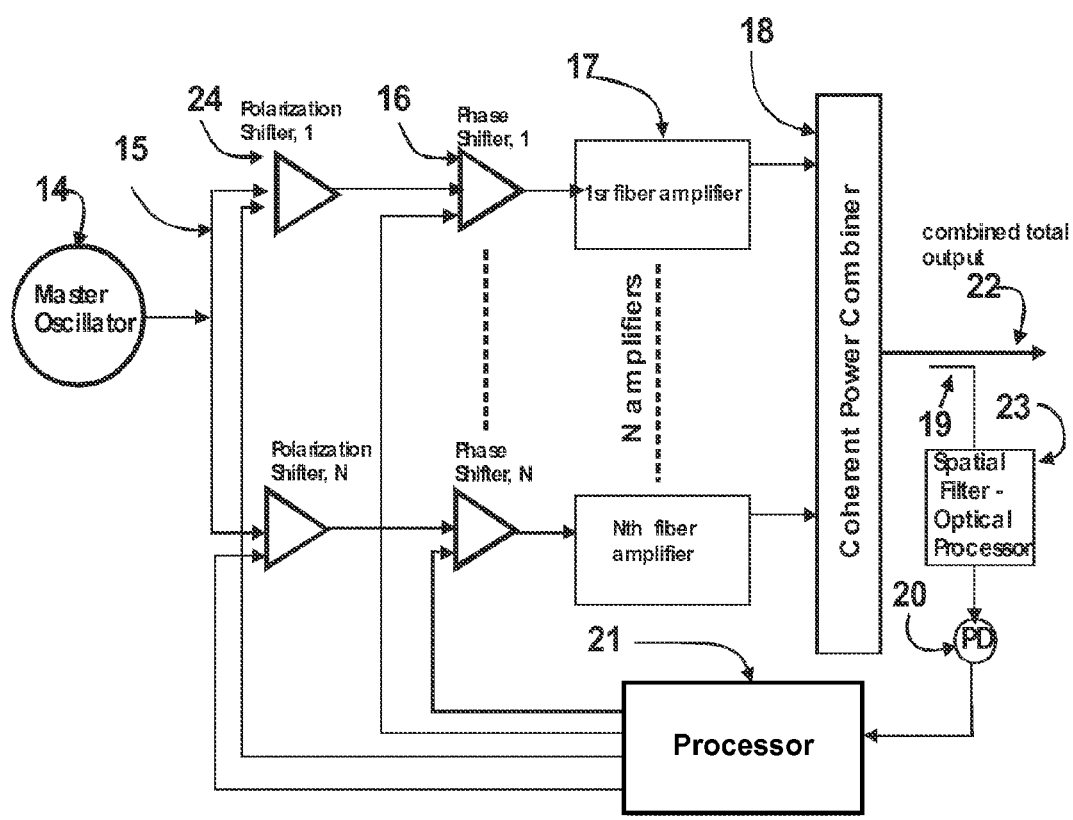
FIG. 4 is a block diagram for polarization optimization in addition to phase optimization to maximize the combined power output.

Another implementation is to adapt the invention to include an additional set of components to optimize the polarization of the amplifier elements, as shown FIG. 4. That is, in order to maximize the combined power of all of the amplifier elements it is necessary to maintain both the same phase and polarization. The polarization optimization circuit operates in much the same manner as the phase optimization process. The operation of the polarization optimization consists of the sequential processor first scanning and optimizing the power output using the phase scanning as previously explained. Then the processor 21 selects a polarization shifter 24 and scans over a polarization shift of $2\pi$ while observing the combined power output signal from the photodetector 20. If a polarization angle is detected that increases the power output; then that polarization angle is set and held until the next scan. The processor 21 then selects another polarization shifter and proceeds likewise through the remaining polarization shifters. Then the processor 21 selects a phase shifter and sequentially scans through all of the phase shifters; and continues the scan process alternating between polarization shifters and phase shifters ad infinitum. Thus both the phase and polarization are maintained at optimized settings to insure the maximum combined power output.

The invention claimed is:

1. A method for implementing a coherent laser beam combining system in which phases of N fiber amplifier outputs are maximized, the method comprising:
   a. splitting the output of a master oscillator laser into an array of N signals;
   b. feeding said N signals into N optical phase adjusters;
   c. optically amplifying the output of said N phase adjusters with N fiber amplifiers;
   d. combining said N amplified signals in a coherent power combiner to produce a combined total output signal;
   e. sampling said combined total output signal and processing said sampled output through a far field spatial imaging optics system and thence to a photodetector, wherein the photodetector output is a voltage which is proportional to a combined far field power;
   f. selecting one of the N phase adjusters using a processor and then sweeping the phase of said adjuster in small steps over a $2\pi$ range and locking said phase adjuster to the phase that corresponds to a maximum photodetector output voltage as the phase is stepped through the $2\pi$ range;
   g. sequentially selecting the next phase adjuster of the N phase adjusters and repeating step f for that phase adjuster and so on for the remaining phase adjusters until the entire array of N phase adjusters are locked into phases that maximize said photodetector output voltage, thereby maximizing the output of said coherent power combiner; and
   h. continually repeating steps f and g to thereby correct any phase errors that may occur over time.

2. The method for implementing a coherent laser beam combining system of claim 1, wherein said sweep of each phase adjuster in small steps over a $2\pi$ range consists of approximately 72 phase steps.

3. The method for implementing a coherent laser beam combining system in which a group of M sub-arrays are combined, each sub-array comprised of N laser amplifiers, the method comprising a cycle of maximizing the output of each sub-array using the method of claim 1 followed by maximizing the thus maximized output of said group of M sub-arrays by the method of claim 1 and continually repeating this cycle to thereby correct any phase errors that may occur over time.

4. A method for implementing a coherent laser beam combining system in which both phases and polarizations of N fiber amplifier outputs are maximized, the method comprising:
  a. splitting the output of a master oscillator laser into an array of N signals;
  b. feeding said N signals into N polarization adjusters and then into N optical phase adjusters;
  c. optically amplifying the output of said N polarization adjusters and N phase adjusters with N fiber amplifiers;
  d. combining said N amplified signals in a coherent power combiner to produce a combined total output signal;
  e. sampling said combined total output signal and processing said sampled output through a far field spatial imaging optics system and thence to a photodetector, wherein the photodetector output is a voltage which is proportional to a combined far field power;
  f. selecting one of the N phase adjusters using a processor and then sweeping the phase of said adjuster in small steps over a $2\pi$ range and locking said phase adjuster to the phase that corresponds to a maximum photodetector output voltage as the phase is stepped through the $2\pi$ range;
  g. sequentially selecting the next phase adjuster of the N phase adjusters and repeating step f for that phase adjuster and so on for the remaining phase adjusters until the entire array of N phase adjusters are locked into phases that maximize said photodetector output voltage, thereby maximizing the output of said coherent power combiner;
  i. selecting one of the N polarization adjusters using a processor and then sweeping the polarization of said adjuster over a $2\pi$ range and locking said polarization adjuster to the polarization that corresponds to the maximum photodetector output voltage as the polarization is swept through the $2\pi$ range;
  j. sequentially selecting the next polarization adjuster of the N polarization adjusters and repeating step i for that polarization adjuster and so on for the remaining polarization adjusters until the entire array of N polarization adjusters are locked into polarizations that maximize said photodetector output voltage, thereby maximizing the output of said coherent power combiner;
  k. continually repeating steps f through i to thereby correct any polarization or phase errors that may occur over time.

5. The method for implementing a coherent laser beam combining system in which both the phase and the polarization of N fiber amplifiers are maximized of claim 4, wherein said sweep of each phase adjuster in small steps over a $2\pi$ range consists of approximately 72 phase steps.

* * * * *